(12) United States Patent
Aiello et al.

(10) Patent No.: US 11,444,764 B2
(45) Date of Patent: Sep. 13, 2022

(54) WATCHDOG KEY SYSTEM FOR DATA SECURITY IN UNMANNED UNDERSEA VEHICLES

(71) Applicant: L3Harris Technologies, Inc., Melbourne, FL (US)

(72) Inventors: Jason D. Aiello, Fairhaven, MA (US); Jeffery A. DeArruda, East Taunton, MA (US); Kevin W. Ludlam, Marlborough, MA (US); Daryl B. Slocum, La Mesa, CA (US); Cagdas Altin, Warren, RI (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 157 days.

(21) Appl. No.: 16/877,001

(22) Filed: May 18, 2020

(65) Prior Publication Data
US 2021/0021417 A1    Jan. 21, 2021

Related U.S. Application Data (60) Provisional application No. 62/875,417, filed on Jul. 17, 2019.

(51) Int. Cl.
| | |
|---|---|
| *H04L 9/08* | (2006.01) |
| *G06F 21/78* | (2013.01) |
| *B63G 8/28* | (2006.01) |
| *H04W 12/041* | (2021.01) |

(52) U.S. Cl.
CPC .............. *H04L 9/0894* (2013.01); *B63G 8/28* (2013.01); *G06F 21/78* (2013.01); *H04L 9/0891* (2013.01); *H04W 12/041* (2021.01); *H04L 2209/80* (2013.01); *H04L 2209/84* (2013.01)

(58) Field of Classification Search
CPC . H04L 9/0894; H04L 9/0891; H04L 2209/80; H04L 2209/84; B63G 8/28; G06F 21/78; H04W 12/041
See application file for complete search history.

(56) References Cited

U.S. PATENT DOCUMENTS

| | | | |
|---|---|---|---|
| 9,871,772 B1 * | 1/2018 | Weinstein | H04L 9/0825 |
| 2007/0271471 A1 * | 11/2007 | Merzlikine | G06F 21/305 |
| | | | 713/193 |

FOREIGN PATENT DOCUMENTS

| | | | | |
|---|---|---|---|---|
| WO | WO-0041058 A1 * | 7/2000 | | G06F 1/1684 |

* cited by examiner

*Primary Examiner* — Matthew T Henning
(74) *Attorney, Agent, or Firm* — Workman Nydegger (57) ABSTRACT

An underwater vehicle system includes a data security system. The data security system includes a data pod including persistent storage. The persistent storage stores encrypted data. The security system includes a watchdog. The watchdog includes at least one processor. The security system includes a watchdog key. The watchdog key is stored in volatile storage. The watchdog key is configured to be used to decrypt the encrypted data. The data security system is configured to remove the watchdog key from the underwater vehicle system, thereby preventing access to the encrypted data on the data pod.

20 Claims, 7 Drawing Sheets

WATCHDOG KEY SYSTEM FOR DATA SECURITY IN UNMANNED UNDERSEA VEHICLES

CROSS-REFERENCE TO RELATED APPLICATIONS

This application claims the benefit of and priority to U.S. Provisional Patent Application Ser. No. 62/875,417 filed on Jul. 17, 2019 and entitled "WATCHDOG KEY SYSTEM FOR DATA SECURITY IN UNMANNED UNDERSEA VEHICLES," which application is expressly incorporated herein by reference in its entirety.

BACKGROUND OF THE INVENTION

Unmanned undersea vehicles (also known as unmanned underwater vehicles, underwater drones, or UUVs) are vehicles that operate underwater without a human occupant. Typically, unmanned undersea vehicles are divided into two categories, remotely operated underwater vehicles (also known as ROVs), and autonomous underwater vehicles (also known as AUVs). Where the former is controlled by a remote human operator and the latter operates independently of human input.

In some applications, unmanned undersea vehicles are required to store and collect classified and/or sensitive information.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes an underwater vehicle system. The underwater vehicle system includes a data security system. The data security system includes a data pod including persistent storage. The persistent storage stores encrypted data. The security system includes a watchdog. The watchdog includes at least one processor. The security system includes a watchdog key. The watchdog key is stored in volatile storage. The watchdog key is configured to be used to decrypt the encrypted data. The data security system is configured to remove the watchdog key from the underwater vehicle system, thereby preventing access to the encrypted data on the data pod.

Additional features and advantages of exemplary embodiments of the invention will be set forth in the description which follows, and in part will be obvious from the descriptions, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The disclosed invention presents an innovative means to protect classified and/or sensitive information stored and collected by an undersea vehicle.

Embodiments disclosed herein comprise apparatuses, systems, components, and methods for unmanned undersea vehicles. These unmanned undersea vehicles can be used to carry payloads and software packages to detect, classify, localize, identify, and/or retrieve targets. In particular, disclosed embodiments may be designed to meet certain constraints. For example, in some embodiments, such unmanned undersea vehicles are designed to be less than 240 pounds, operate at 1000 feet below the surface of a body of water, be less than 99 inches in length, and/or be less than 9 inches in diameter. Indeed, in some embodiments, such unmanned undersea vehicles may be configured to be used in torpedo tubes of various watercraft.

Embodiments illustrated herein may include components that help to meet certain corrosion resistance requirements. Alternatively, or additionally, embodiments may include components configured to meet certain buoyancy requirements. Finally, the unmanned undersea vehicle may include components to protect collected data, including in some embodiments, a watchdog, a watchdog key, and a data pod.

In the following disclosure, various exemplary embodiments of the present invention are recited. One will understand that these examples are provided only for the sake of clarity and explanation and do not limit or otherwise confine the invention to the disclosed examples. Additionally, one or more of the following examples is provided with respect to an "underwater vehicle." One will understand that the usage of an "underwater vehicle" is merely for the sake of clarity and that the present invention applies equally to all unmanned undersea vehicle platforms.

Figure 1A:
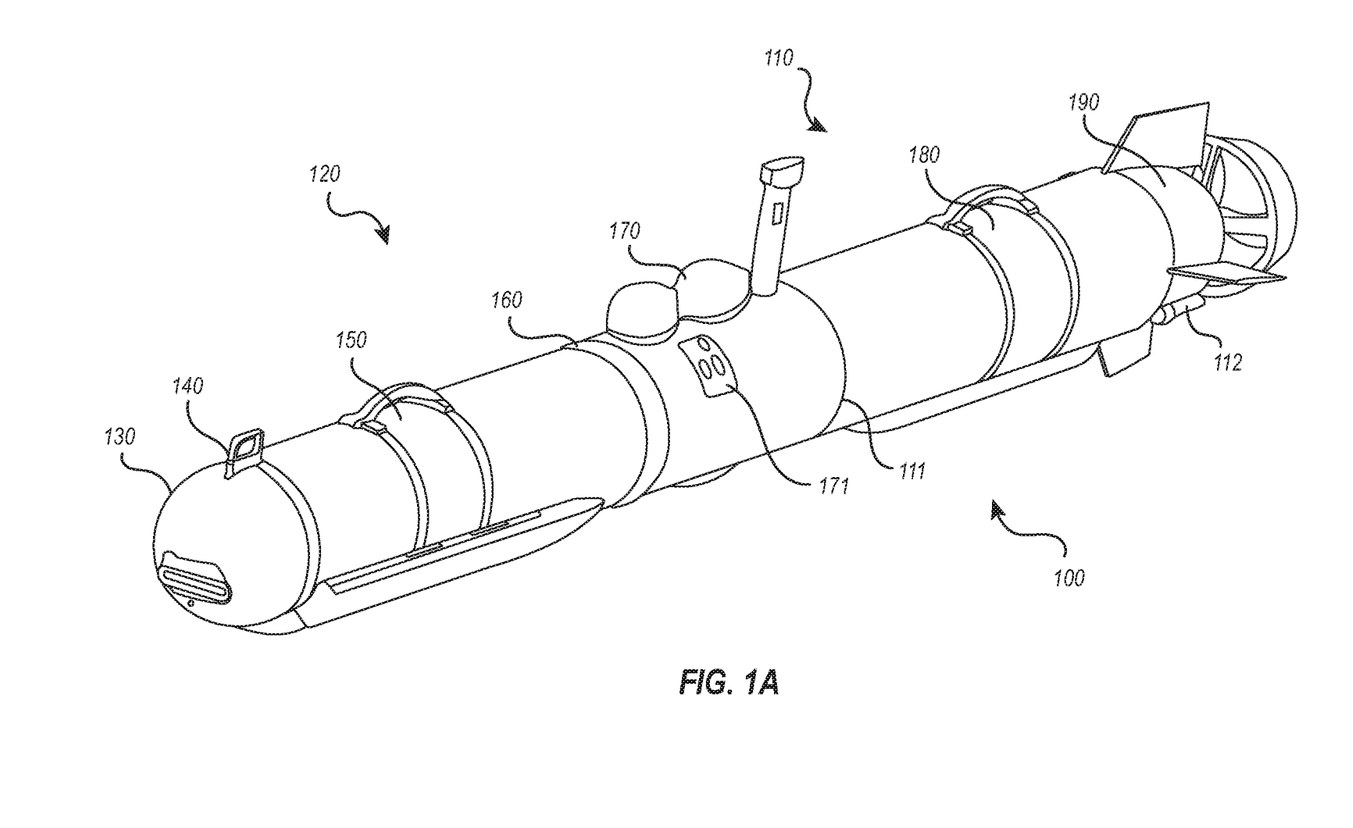
FIG. 1A illustrates a perspective view of an exemplary unmanned undersea vehicle.
Figure 1B:
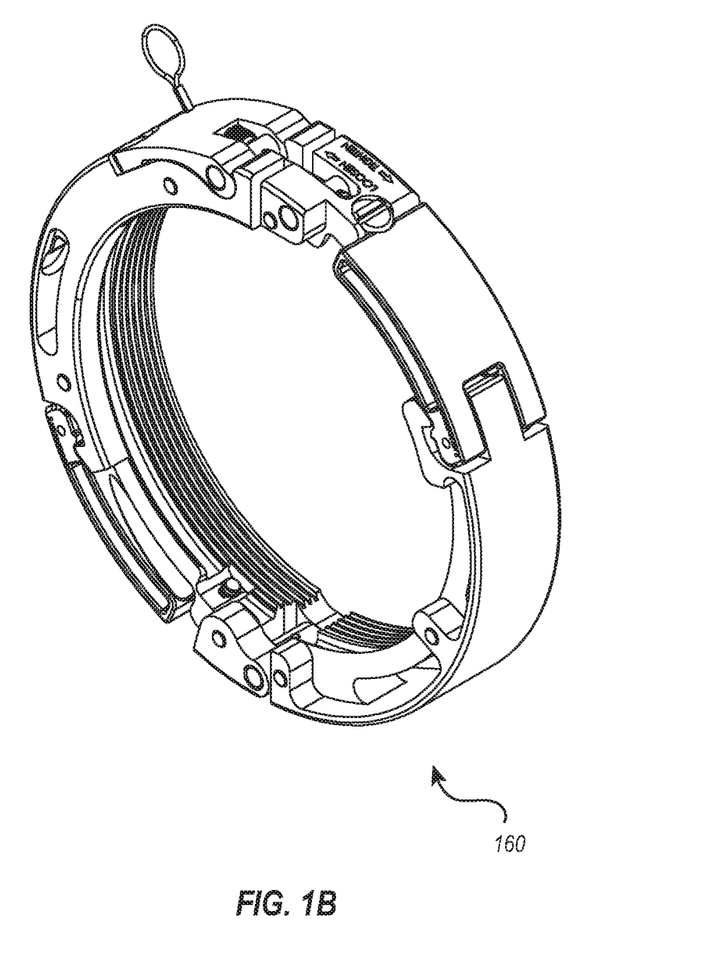
FIG. 1B illustrates a perspective view of an exemplary joiner clamp of FIG. 1A.

FIG. 1a illustrates an exemplary underwater vehicle 100 that comprises an aft section 110 and a forward section 120 attached by a joiner clamp 160 (see FIG. 1b). In some embodiments, the forward section 120 may include a quick release bow clamp 140, thereby allowing section 130 (see FIG. 1c) to be completely or partially removed from section 150. Alternatively, or additionally, the aft section 110 may include a tail section 190 (see FIG. 1d) and/or a data pod 171

Figure 1C:
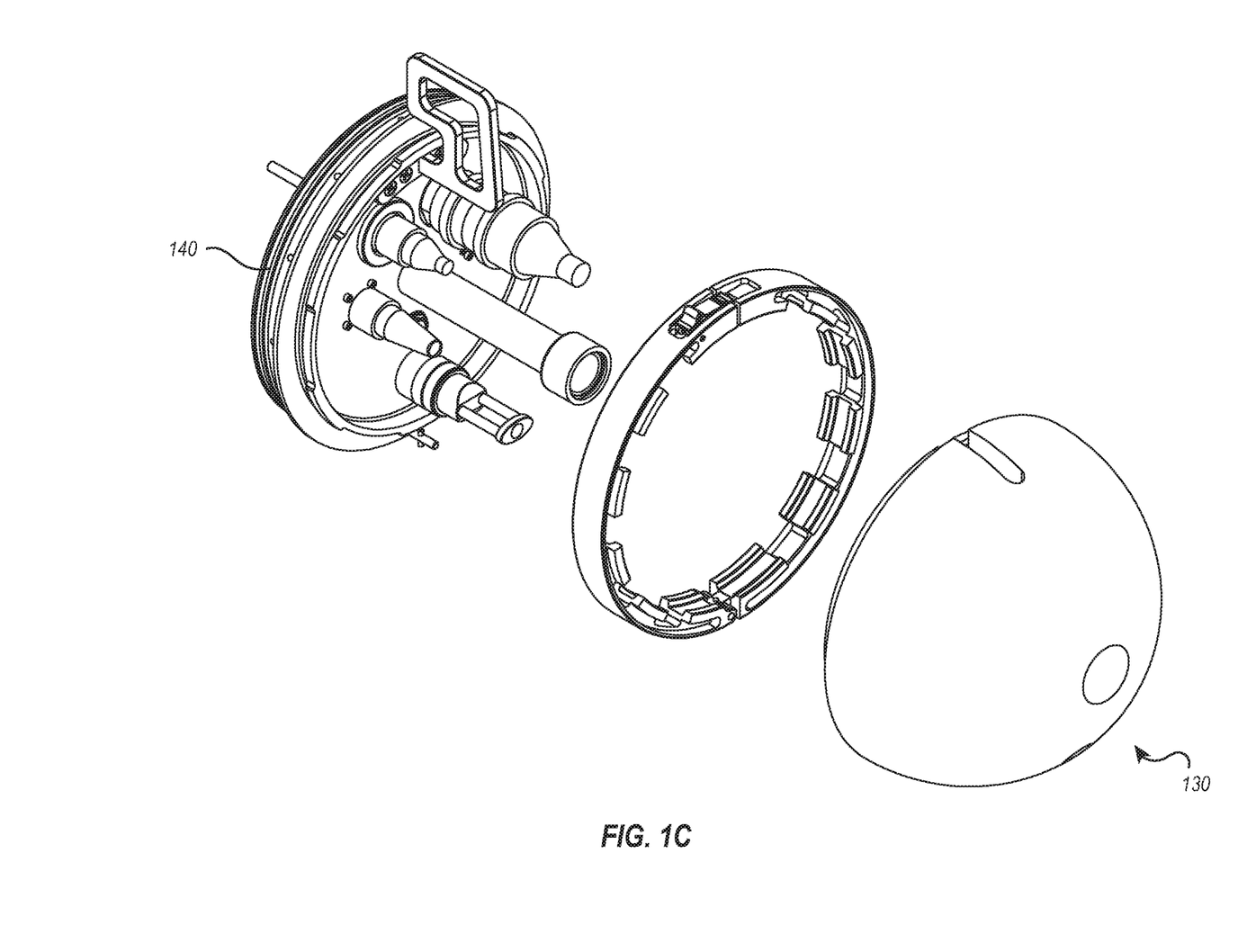
FIG. 1C illustrates a perspective view of an exemplary quick release bow clamp of FIG. 1A and a front section of FIG. 1A.
Figure 1D:
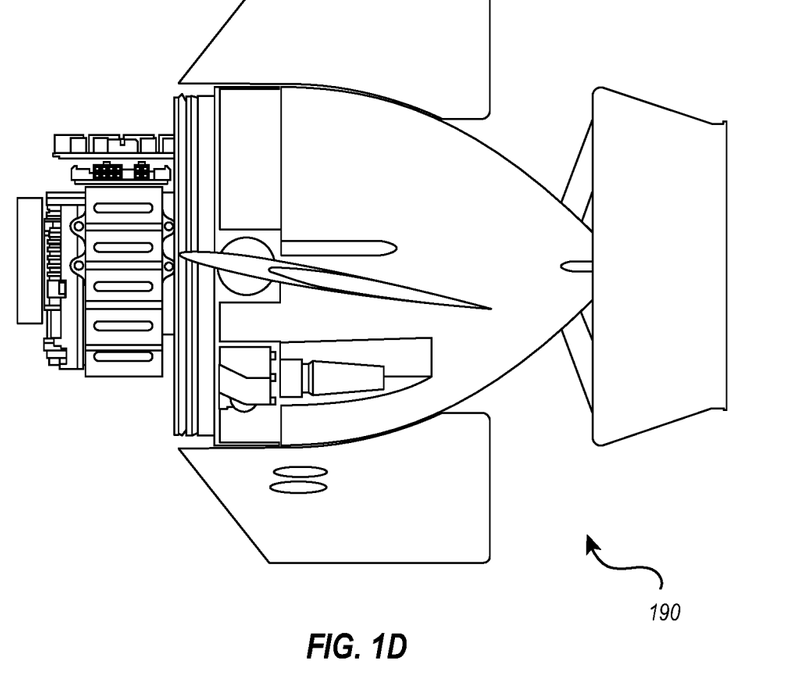
FIG. 1D illustrates a perspective view of an exemplary tail section of FIG. 1A.

(see FIG. 1c). The aft section 110 may be completely or partially separated into smaller components at junctions 111 and 112, thereby allowing section 170 to be completely or partially separated from section 180, and alternatively, or additionally, allowing section 180 to be completely or partially separated from the tail section 190.

In some applications, the underwater vehicle 100 may be required to perform missions that involve classified information. Thus, in some embodiments, the underwater vehicle 100 is configured to protect sensitive information from authorized entities. In one example, the underwater vehicle 100 employs a data security system 200 (see FIG. 2). The data security system comprises a combination of at least a data pod 171, a watchdog 201, and a watchdog key 202. Further, in one embodiment, the data security system is powered by a modular battery system 374 (see FIG. 3). Alternatively, or additionally, the data security system is powered by any system capable of providing sufficient power for the system to properly operate.

Data Pod for a Data Security System

Figure 1E:
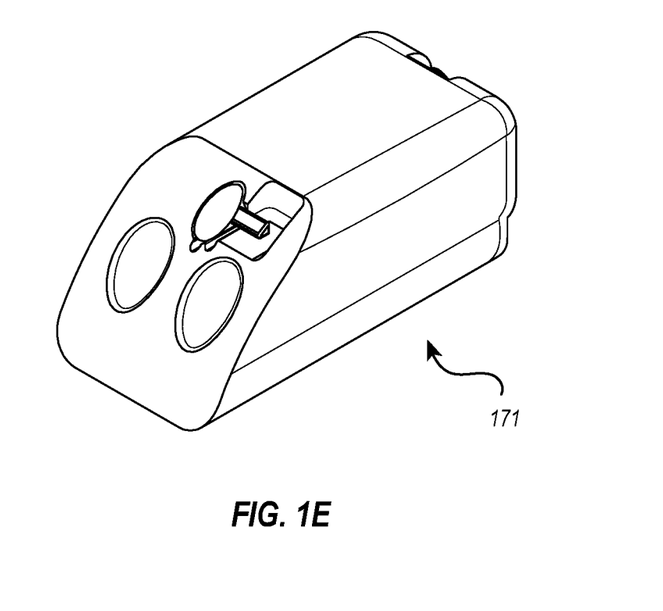
FIG. 1E illustrates a perspective view of an exemplary data pod of FIG. 1A.

In some embodiments, the underwater vehicle 100 includes a data pod 171. In one embodiment, the data pod 171 may include storage such as hard drives, SSD drives, and/or other nonvolatile storage type devices. The data pod 171 is configured to store data that may be related to the current mission of the underwater vehicle 100. For example, the data pod 171 may store information related to detecting, classifying, localizing, identifying, and/or retrieving targets for a current mission. For example, this information may be information related to instructions for the vehicle for performing one or more of these operations. For example, the data pod 171 may store programmatic instructions indicating how the vehicle 100 should be navigated. The data pod 171 may include programmatic instructions indicating how sensors on the vehicle 100 should be used to detect, classify, localize, identify a particular target. The data pod 171 may include programmatic instructions indicating how robotic arms or other retrieval devices should be operated to retrieve a target.

Alternatively, or additionally, data pod 171 may include data collected when performing activities such as detecting, classifying, localizing, identifying, and/or retrieving targets mission. For example, the data pod 171 may store various images or other sensor outputs used for detecting and/or classifying targets. For example, various images, GPS coordinates, water depth measurements, sonar signal times, chemical concentration levels, and/or sensor readings may be stored on the data pod 171. Thus, the data pod 171 may include coordinate information identifying locations of targets. The data pod 171 may include results of computational operations related to detecting, classifying, localizing, identifying, retrieving, or other activities. The data pod 171 may include information related to a history of actions performed by equipment such as robotic arms, steering mechanisms, or other equipment on the vehicle 100.

Alternatively, or additionally, the data pod 171 is configured to store data that may be related to future missions of the underwater vehicle 100. For example, in some embodiments, the data pod 171 may include information for one or more future missions. Such information may include instructions navigating the vehicle 100 in the future missions. Alternatively, or additionally, the data pod 171 may include computer executable instructions related to actions performed for detecting, classifying, localizing, identifying, retrieving, or other activities or future missions, such as instructions related to equipment control, decision-making based on collected data, methods of collecting data, and so forth.

Alternatively, or additionally, the data pod 171 is configured to store data that may be related to previous missions of the underwater vehicle 100. For example, the data pod 171 may include a sufficient amount of storage for storing data related to previous missions. Such data may include instructions for controlling equipment during previous missions alternatively, or additionally, the data may include collected data collected as a result of performing various actions such as detecting, classifying, localizing, identifying, retrieving, or other activities performed during the previous missions. For example, some such data may include locations where targets were identified, distinguishing characteristics of targets, photographs or other sensor outputs collected when attempting to perform mission objectives, etc.

The section 130, in some embodiments of the underwater vehicle 100, may be constructed at least partially having a foam shell which provides weight savings and buoyancy. In particular, the section 130 may be positively buoyant when submerged in water. In some embodiments, the section 130 is constructed from syntactic foam including hollow glass beads and urethane. In other embodiments, the section 130 is constructed from material appropriate for underwater use and/or navigation. The section 130 may include open portions and/or portions covered by alternative materials, for use with sensors. For example, in some embodiments, one or more sonar sensors 331 (see FIG. 3) may be used by the underwater vehicle 100. In some embodiments, the section 130 will include a portion that is penetrable by the one or more sonar signals produced by the one or more sonar sensors 331. Alternatively, or additionally, sonar sensors 331 may be incorporated or included in other sections of the underwater vehicle 100.

In one example, the data pod 171 may be configured to store the data generated and collected by the sensors.

Figure 4:
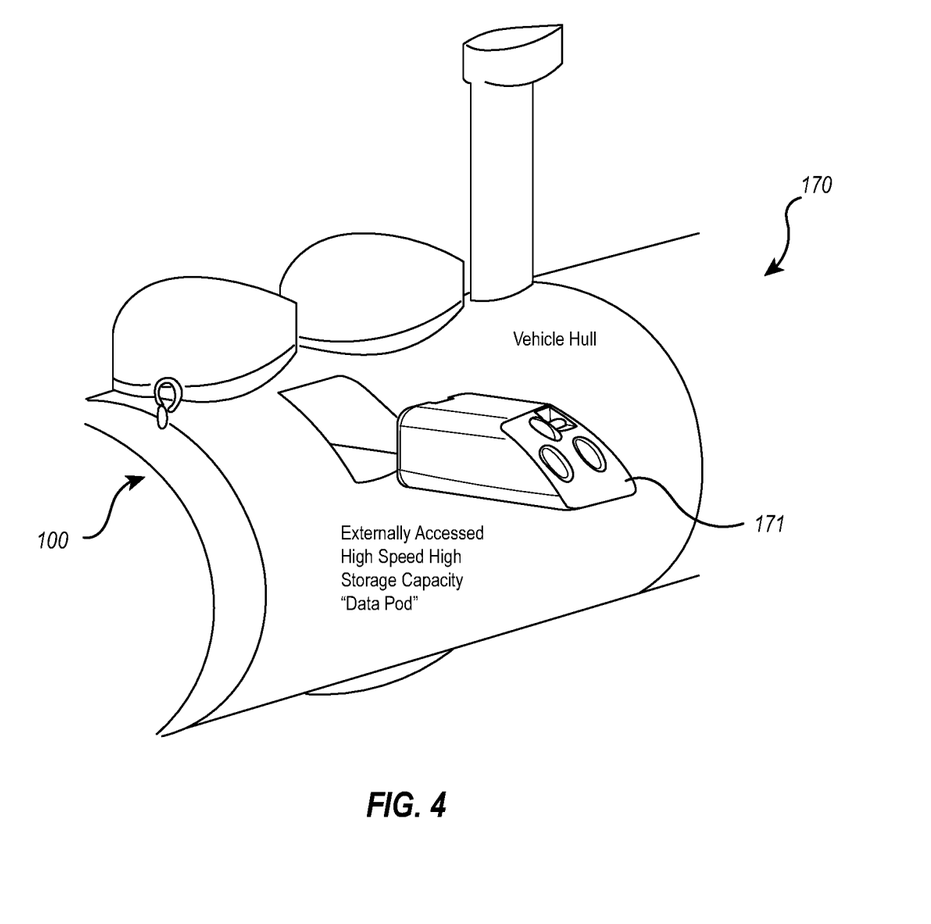
FIG. 4 illustrates a perspective view of removable data pod.

In some embodiments, the data pod 171 is permanently affixed to the underwater vehicle 100, whereas in other embodiments the data pod 171 is a removable data pod. FIG. 4 illustrates an example of a data pod 171 that is removable from the underwater vehicle 100. In the example illustrated in FIG. 4, the data pod 171 is shown with various holds which can be grasped by a user to apply an appropriate force to remove the data pod 171 from the underwater vehicle 100.

In some embodiments, the data pod 171 is the only location on the underwater vehicle 100 where certain data can be persistently stored, where persistently storing means storing in a fashion where the data remains even after power to a device storing the data is shut off. That is, in some embodiments, the data pod 171 is the only location on the underwater vehicle 100 where data can exist even after power is lost to the underwater vehicle or to certain components in the underwater vehicle 100. In other words, in some embodiments, the data pod 171 is the only persistent storage for certain types of data on the underwater vehicle 100.

Thus, if power is lost to the underwater vehicle 100, the data pod 171 will persist any written data, however other portions of the underwater vehicle 100, that are not powered, may lose all data. In other embodiments, when power is lost to the underwater vehicle 100, the data pod 171 will persist any written data, however other portions of the underwater vehicle 100 may lose any data not associated with the background operation of the underwater vehicle 100.

In particular, certain categories of data are only stored persistently on the data pod 171, whereas when data of those categories exist elsewhere in the underwater vehicle 100, they are stored in a volatile fashion such that those data will be lost if power to the devices storing those data is disconnected. Some such categories are now illustrated.

For example, in some embodiments, data collected by certain sensors will only be stored persistently at the data pod 171 if that data exists in other locations in the underwater vehicle 100, it will only exist in a volatile fashion. For example, in some embodiments, data collected from certain cameras (including visible light and/or IR), sonar devices, depths sensors, GPS or other geo-locating hardware, bathymetry hardware, etc. will only ever be stored persistently on the data pod 171. When data from those devices exists in the underwater vehicle 100 in other locations, it will only exist in a volatile fashion.

In some embodiments, any data transmitted from certain hardware will not be allowed to be stored persistently in any location on underwater vehicle 100 except the data pod 171. For example, in addition to the sensor hardware described above, hardware such as certain processors, memory devices, communication busses, or other hardware devices will be configured in the underwater vehicle 100 in a fashion where any data transmitted from those devices is not permitted to be stored in persistent storage, unless that persistent storage is the data pod 171.

Figure 2:
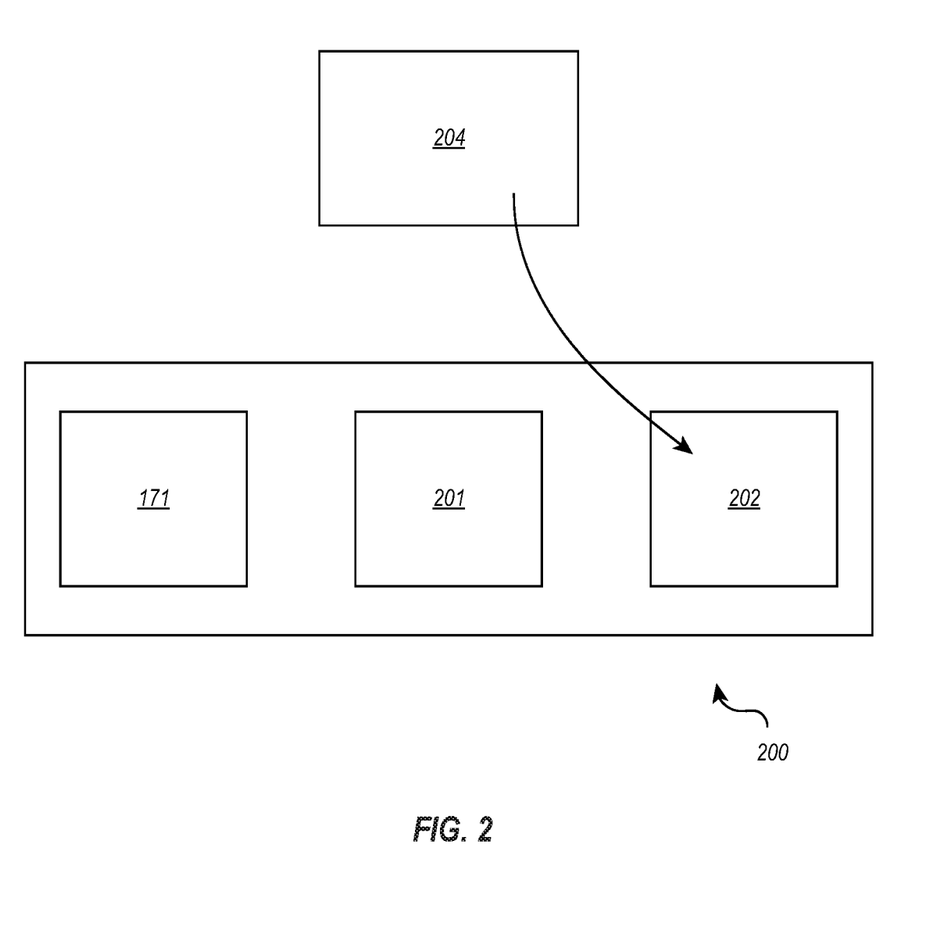
FIG. 2 illustrates a data security system.
Figure 3:
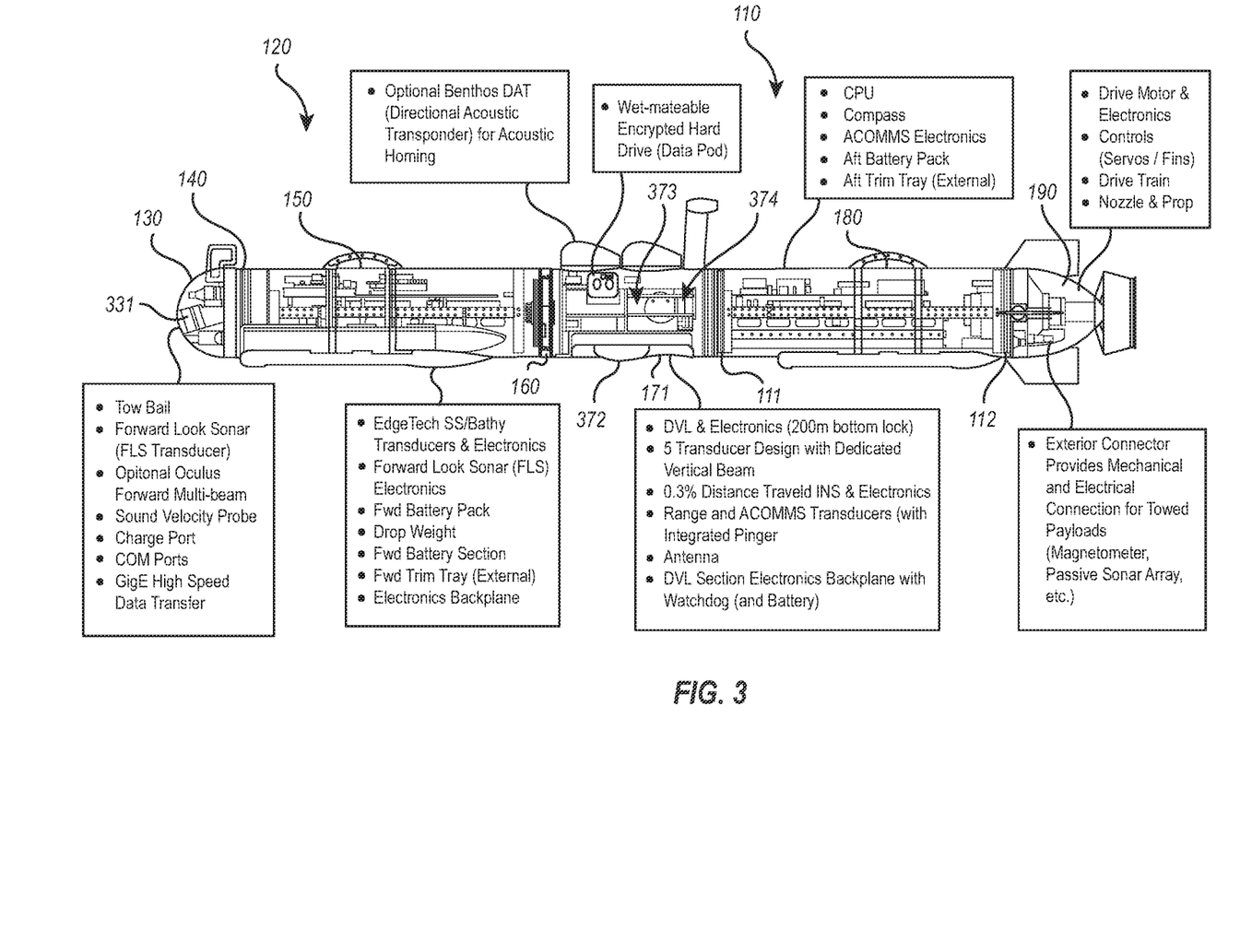
FIG. 3 illustrates a perspective view of an interior of an exemplary unmanned undersea vehicle.

In some embodiments, the data pod 171 includes at least a portion of encrypted data. Such data can only be read using the watchdog key 202. When the watchdog key 202 is unavailable, the encrypted data stored on the data pod 171 is unreadable.

Watchdog Key for a Data Security System

In some embodiments, the watchdog key 202 is configured to encrypt, and/or decrypt data stored on the data pod 171.

In one embodiment, the watchdog key 202 is stored in volatile memory, thereby offering protection to encrypted data stored in the data pod 171. In some examples, the watchdog key 202 is stored in volatile memory by the watchdog 201, while in other examples the watchdog key 202 is stored in volatile memory by some other processor or device capable of writing to memory. For example, FIG. 2 illustrates a device 204. The device 204 can write the watchdog key 202 to the data security system 200. For example, in some embodiments, the device 204 may be an external device that is external to the underwater vehicle 100, and is used when preparing the underwater vehicle 100 for a mission. In particular, the watchdog key 202 can be generated at the external device 204 and provided to the data security system 200. A copy of the watchdog key 202 may be stored at the device 204 to allow data to be recovered from the data pod 171. For example, if the data pod 171 can be recovered and coupled to the device 204, the data on the data pod 171 can be decrypted, even if the watchdog key 202 on the vehicle itself is lost. In this example, the device 204 may be protected by physical barriers, locks, guard personnel, or other means to ensure that a copy of the watchdog key on the device 204 cannot be compromised. Thus, in this case, security of the data pod 171 can ultimately be insured by physical protection means of the device 204.

If the power supporting the volatile memory storing the watchdog key 202 is terminated, the watchdog key 202 will be lost, thereby rendering the data in the data pod 171 unreadable. In one embodiment, even if the power supporting the volatile memory storing the watchdog key 202 is restored, after being terminated, the watchdog key 202 will have been irretrievably lost from the perspective of the underwater vehicle 100. As noted however, if the underwater vehicle 100 can be brought proximate the device 204, then the watchdog key stored at the device 204 can be used to decrypt the data in the data pod 171. Thus, in this way, if the underwater vehicle 100 is captured by unauthorized personnel, the data in the data pod 171 will be safe. However, if the underwater vehicle 100 is retrieved by friendly personnel then the underwater vehicle can be provided to authorized individuals with access to the device 204, who can then use a copy of the watchdog key 202 stored at the device 204 to decrypt the data on the data pod 171.

Watchdog for a Data Security System

The data security system 200 may, in some instances, include a watchdog 201. The watchdog 201, in some embodiments, is configured to protect the data stored in the data pod 171 and other data storage locations on the underwater vehicle 100.

In some embodiments, the watchdog 201 may be implemented using various processors, memory, computer instructions (which may be stored in volatile memory, stored in firmware, or combinations thereof). Typically, the watchdog 201 will be implemented using at least one hardware processor.

In one embodiment, the watchdog 201 is configured to include certain countermeasures. For example, the watchdog 201 may be configured to detect when tampering has occurred to the underwater vehicle 100. For example, the watchdog 201 may be configured to detect that portions of the underwater vehicle 100 have been removed from the underwater vehicle 100. Alternatively, or additionally, the watchdog 201 may be configured to detect that certain hatches, data ports, or other elements on the underwater vehicle 100 have been accessed. In some embodiments this can be accomplished through detecting impacts to the underwater vehicle 100. Alternatively, or additionally, this may be detected by using certain switches, strain gages, ohmmeters, capacitance meters, material sensors, etc. Alternatively, or additionally, the watchdog 201 may be configured to determine that the underwater vehicle 100 has been moved to an unexpected location through the use of GPS sensors, cellular data connections, or other geolocation methods, altimeters, air sensors, moisture sensors, etc. Alternatively, or additionally, embodiments may be configured to detect that the underwater vehicle 100 has been unable to move for a particular period of time.

In some embodiments, if the detected interaction with the underwater vehicle 100 or intrusion of the underwater vehicle 100 or lapse of stationary time, or movement to an unexpected location, is sufficiently significant, the watchdog 201 can cause the watchdog key 202 stored in volatile memory to be irretrievably discarded. In some embodiments, this can be performed by cutting power to the volatile memory storing the watchdog key 202. Alternatively, or additionally, this can be accomplished by the watchdog 201 writing all ones, all zeros, random values, or other values to the volatile memory location storing the watchdog key 202. This prevents individuals who may have captured the underwater vehicle 100 from being able to read the data in the data pod 171. Thus, for example, sufficiently significant may refer to the watchdog determining that the underwater vehicle 100 has been stationary for a particular period of time, determining that the underwater vehicle 100 has sustained an impact of a certain magnitude, determining that the underwater vehicle has deviated from an authorized course by a certain distance, determining that particular physical barriers of the underwater vehicle 100 have been breached, or other determinations.

In yet another example of the watchdog 201, a remote user may terminate the power to devices storing the watchdog key 202 through a control computer system, a smart device, or some other computing device capable of wireless communication.

Implementation of Data Security System

In one embodiment, the watchdog key 202 can be generated on initial startup of the underwater vehicle 100. In some embodiments, this can be accomplished by connecting the underwater vehicle 100 to a control computer system and supplying the control computer system with a secret key which can be used to generate the watchdog key 202 for the underwater vehicle 100. As discussed above, the device 204 may be or may be part of the control computer system used to generate the watchdog key 202. The control computer system may be any computer, smart device, or computing device capable of handling the necessary computing power to configure the watchdog key 202 and/or generating an initial startup sequence for the underwater vehicle 100. For example, there are various communication ports under the section 130 that can be coupled to an external computer system. The communication ports are coupled to the watchdog. This allows the external computer system to be coupled to the watchdog to provide the generated watchdog key 202 to the watchdog. As illustrated above, the watchdog can store this generated watchdog key 202 in volatile memory of the watchdog for use in reading and writing data to the data pod 171. Alternatively, or additionally, the control computer may generate a watchdog key 202 for the underwater vehicle 100 through wireless communication. In one embodiment, the control computer may utilize wi-fi, Bluetooth, Air Drop, or any other means of transmitting wireless data to generate the watchdog key 202 on the underwater vehicle 100.

For example, in some embodiments the control computer system may include a key generation module configured to generate encryption keys for the data pod 171. In some embodiments, the key generation module is configured to receive a key from a user and to generate an encryption/decryption key that can be used to encrypt/decrypt data on the data pod 171.

The encryption/decryption key can be used to read and write data from and to the data pod 171. Additionally, the key generation module can be used to later regenerate the encryption/decryption key should the key be lost in the watchdog. In this way, data on the data pod 171 can be read at a later time by a user that has the key used for creating the encryption/decryption key.

Some embodiments may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or essential characteristics. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. An underwater vehicle system comprising:
   a data security system, further comprising:
   a data pod, comprising persistent storage, the persistent storage storing encrypted data;
   a watchdog, wherein the watchdog comprises at least one processor;
   a watchdog key, wherein the watchdog key is stored in volatile storage, the watchdog key configured to be used to decrypt the encrypted data; and
   wherein the data security system is configured to remove the watchdog key from the underwater vehicle system upon the watchdog detecting a condition where the encrypted data at the persistent storage needs to be protected, thereby preventing access to the encrypted data on the data pod, wherein the condition where the encrypted data at the persistent storage needs to be protected comprises detecting inability of the underwater vehicle system to move for a particular period of time.

2. The underwater vehicle system of claim 1, wherein the data pod is configured to store collected data related to a mission for the underwater vehicle system, as at least a portion of the encrypted data.

3. The underwater vehicle system of claim 1, wherein the watchdog is configured to detect tampering or unauthorized access to the underwater vehicle system.

4. The underwater vehicle system of claim 3, wherein upon detecting tampering or unauthorized access to the underwater vehicle system the watchdog is configured to remove the watchdog key from the underwater vehicle system.

5. The underwater vehicle system of claim 1, wherein removing the watchdog key from the underwater vehicle system comprises overwriting the watchdog key with other values.

6. The underwater vehicle system of claim 1, wherein the underwater vehicle system is configured to connect to a control computer configured to provide the watchdog key.

7. The underwater vehicle system of claim 6, wherein the control computer is configured to generate the watchdog key on the underwater vehicle system.

8. The underwater vehicle system of claim 7, wherein the control computer is configured to wirelessly generate the watchdog key on the underwater vehicle system.

9. The underwater vehicle system of claim 7, wherein the control computer is configured to regenerate the watchdog key.

10. The underwater vehicle system of claim 9, wherein the control computer is configured to decrypt the data pod on the underwater vehicle system.

11. The underwater vehicle system of claim 10, wherein the control computer is configured to wirelessly decrypt the data pod on the underwater vehicle system.

12. The underwater vehicle system of claim 10, wherein the control computer is configured to be coupled to the underwater vehicle system and decrypt the data pod on the underwater vehicle system.

13. The underwater vehicle system of claim 6, wherein the control computer is not located on the underwater vehicle system.

14. The underwater vehicle system of claim 1, wherein the watchdog is configured to movement of the underwater vehicle system to an unexpected location, and to remove the watchdog key from the underwater vehicle system as a result.

15. The underwater vehicle system of claim 1, wherein the watchdog is configured to detect an impact to the underwater vehicle system, and to remove the watchdog key from the underwater vehicle system as a result.

16. The underwater vehicle system of claim 1, further comprising a plurality of sensors coupled to the data pod and wherein the data security system is configured to encrypt and store data from the sensors to the data pod using the watchdog key, such that locally collected data is protected by a watchdog key stored in volatile storage.

17. A method of protecting data at an underwater vehicle system, the method comprising:
    at a data pod, comprising persistent storage, storing encrypted data at the persistent storage;
    at a watchdog, comprising at least one processor, storing a watchdog key, wherein the watchdog key is stored in volatile storage, the watchdog key configured to be used to decrypt the encrypted data; and
    upon the watchdog detecting a condition where the encrypted data at the persistent storage needs to be protected, removing the watchdog key from the underwater vehicle system, thereby preventing access to the encrypted data on the data pod, wherein detecting a condition where the encrypted data at the persistent storage needs to be protected comprises detecting inability of the underwater vehicle system to move for a particular period of time.

18. The method of claim 17, wherein removing the watchdog key from the underwater vehicle system is performed by overwriting the key with random values.

19. A method of manufacturing an underwater vehicle system, the method comprising:
    providing a data security system, comprising:
        providing a data pod, comprising persistent storage, the persistent storage configured to store encrypted data;
        coupling a watchdog to the data pod, wherein the watchdog comprises at least one processor, wherein the watchdog is configured to store a watchdog key stored in volatile storage, the watchdog key configured to be used to decrypt the encrypted data; and
        configuring the data security system to remove the watchdog key from the underwater vehicle system upon the watchdog detecting a condition where the encrypted data at the persistent storage needs to be protected, thereby preventing access to the encrypted data on the data pod, wherein the condition where the encrypted data at the persistent storage needs to be protected comprises detecting inability of the underwater vehicle system to move for a particular period of time.

20. The method of manufacturing an underwater vehicle system of claim 19, further comprising configuring the data security system to remove the watchdog key from the underwater vehicle system upon the watchdog detecting tampering or unauthorized access to the underwater vehicle system.

\* \* \* \* \*